H. T. HERR.
AUTOMATIC HOIST BRAKE AND CLUTCH ADJUSTER.
APPLICATION FILED MAR. 13, 1907.
971,377.  Patented Sept. 27, 1910.
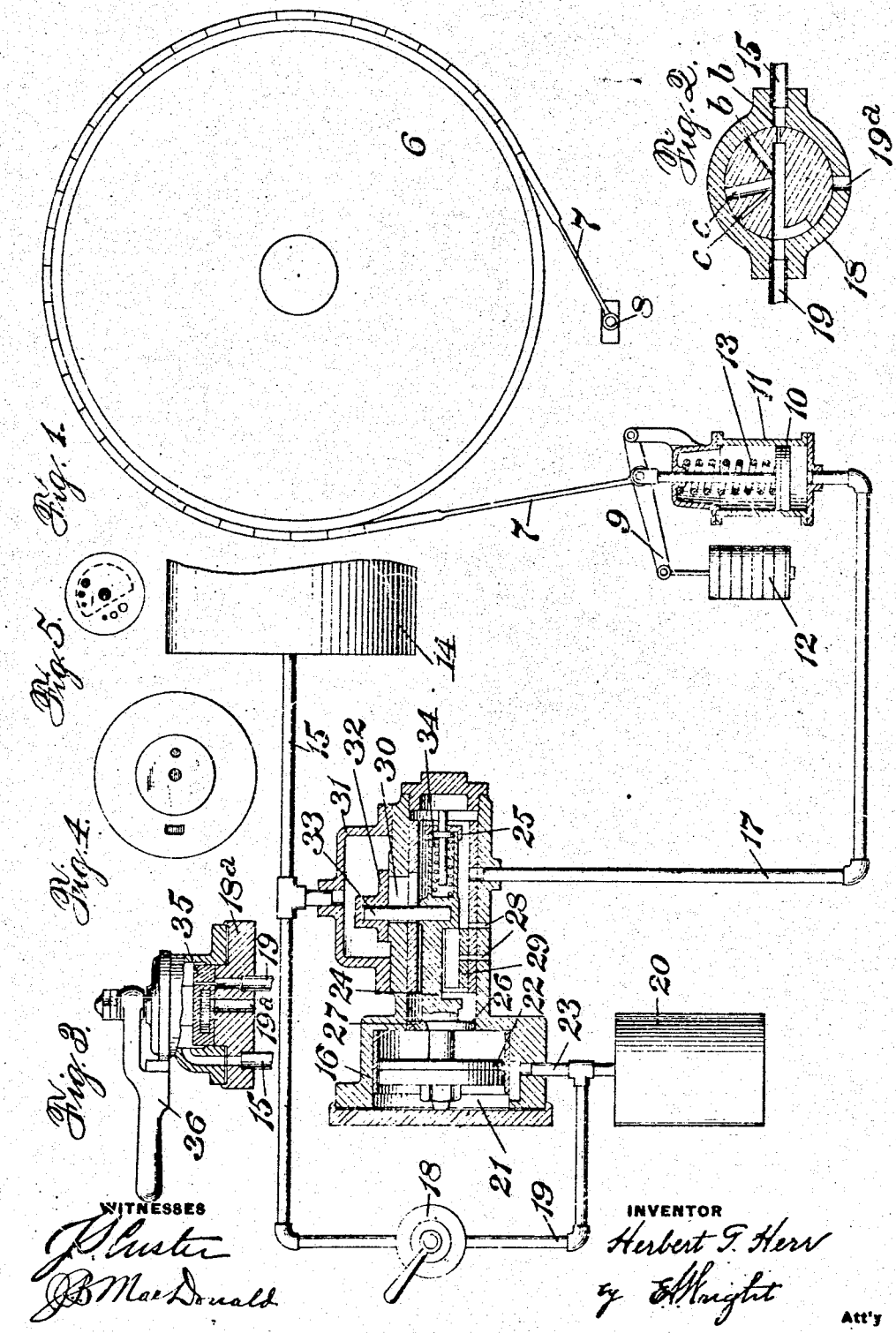
WITNESSES  INVENTOR
Herbert T. Herr
by E. Wright
Att'y

UNITED STATES PATENT OFFICE.

HERBERT T. HERR, OF DENVER, COLORADO, ASSIGNOR TO THE WESTINGHOUSE AIR BRAKE COMPANY, OF PITTSBURG, PENNSYLVANIA, A CORPORATION OF PENNSYLVANIA.

AUTOMATIC HOIST-BRAKE AND CLUTCH ADJUSTER.

971,377.　　　　Specification of Letters Patent.　　Patented Sept. 27, 1910.

Application filed March 13, 1907. Serial No. 362,164.

*To all whom it may concern:*

Be it known that I, HERBERT T. HERR, a citizen of the United States, residing at Denver, in the county of Denver and State of Colorado, have invented certain new and useful Improvements in Automatic Hoist-Brake and Clutch Adjusters, of which the following is a specification.

My invention relates to brakes for hoisting engines and analogous structures and more particularly to the means employed for operating the brake, and its objects are: to provide a hoist brake mechanism having a constantly acting force tending to apply the brake, and a fluid pressure acting in opposition to said force for controlling the power with which the brake is applied and for releasing the same; to provide a form of such apparatus in which the operation of the brake is controlled through the medium of a valve which may be located either adjacent to or at a distance from the brake mechanism proper; to provide an apparatus wherein the degree and quickness of brake application may be regulated with certainty and facility; to provide an apparatus of the class specified wherein the brake when once applied with a predetermined amount of power, will remain so, irrespective of any leakage which may occur in the system; and to provide generally a greatly improved form of brake mechanism particularly adapted for use in connection with hoisting engines and analogous structures. These objects and other advantages which will hereinafter appear, I attain by means of the construction illustrated in preferred form in the accompanying drawings, wherein:—

Figure 1 is an end view of the drum of a hoisting engine having my improvement applied thereto, the brake cylinder and controlling valve being shown in section for the purpose of illustration. Fig. 2 is a transverse section of the form of operating valve shown in Fig. 1, and its connections. Fig. 3 is a sectional view taken at right angles to the above; of a slightly modified form of operating valve, and, Figs. 4 and 5 are plan views of the valve seat and valve, respectively, of the valve shown in Fig. 3.

In the practice of my invention I provide a brake mechanism, such for instance as that shown in Fig. 1, consisting of a brake drum 6, acted upon by an encircling band 7, having one end pivotally attached to a fixed point 8, and its other end attached in a like manner to an operating lever 9, so that the band will grip the drum when the lever is depressed and be released when the lever is raised. The lever 9 is raised by means of the piston 10, which moves in a brake cylinder 11, and is normally kept depressed with the band gripping the drum, through the medium of an adjustable weight 12 suspended upon its free end, supplemented by a spring 13 interposed between the piston 10 and one end of its cylinder in a manner to coöperate with the weight 12, and as will be obvious either the weight or spring may be dispensed with, and one member alone relied upon to operate the brake, without departing from the spirit of my invention, although I prefer to make use of a combination of spring and adjustable weight, as illustrated in the drawings.

From the foregoing it will be seen that the degree of application of the brake can be controlled by the amount of pressure acting to raise the piston, it being obvious that the force exerted upon the brake will be equal to the difference between the combined weight 12 and spring 13, and the pressure acting to raise the piston. To supply such pressure I provide a supply of fluid under pressure which is contained in a main reservoir 14, which may be delivered as desired, by means of a system of piping and valves to be presently described, to the space in the cylinder 11 below the piston 10.

The main reservoir 14 may be charged from any desired source of supply operated either from the hoist itself or independently, and is provided with a pipe 15, leading into a controlling valve mechanism 16, which in turn is connected by a pipe 17 to the cylinder 11. The pipe 15 is also connected to the operating valve 18, which latter is provided with a pipe 19, connected to the controlling valve 16 and chamber 21 at the outer face of the piston 22.

The controlling valve 16 comprises a body portion provided at one end with a cylindrical chamber 21 communicating with pipe 19, in which is fitted a piston 22, said chamber being preferably provided with an additional chamber 20 connected thereto through pipe 23. The object of the additional chamber 20 is to provide an increased volume of fluid under pressure on one side of the piston 22 and adjacent thereto, whereby the variation of pressure in the pipe 19 when the operating valve 18 is manipulated, will be subject to better control. The piston 22 is provided with a stem 24 projecting into a chamber 25 of a smaller diameter than the chamber 21, and a disk 26 is formed upon the stem 24 to fit said chamber, connection being established between chambers 21 and 25 through a port or series of ports 27 formed in the disk 26. The chamber 25 is also connected on its lower side to the cylinder 11 by means of a pipe 17, and is also connected to the atmosphere by means of the ports 28 arranged to be opened and closed by a slide valve 29, which latter is operated by the movement of the piston 22. The chamber 25 is further provided with a port 30 opening into a valve chest 31 which in turn is in open communication with the main reservoir by means of the pipe 15. The port 30 is opened and closed by means of a slide valve 32, which is operated coincidently with the movement of the piston 22, and the stem 24 to which it is connected by means of a pin 33. The stem 24 is provided upon its rear end with a spring stop device 34, so arranged that when the piston 22 is moved toward the right, the spring will be compressed and will always aid to move the piston to the left coincidently with any reduction of pressure in the pipe 19 and its connections. The casing of the operating valve 18 in addition to the connections for the pipes 15 and 19, is provided with an exhaust opening 19ª, to the atmosphere, and the valve is provided with a series of admission ports $b$ of varying size, and a like series of exhaust ports $c$ as will be see by reference to Fig. 2, in order to control the admission and exhaust of fluid pressure to and from the operating mechanism, and thereby more readily manipulate the brake at a predetermined pressure.

The operation of my device is as follows: Assuming the parts to be in the position shown in Fig. 1 with the operating valve 18 in the lap position, it will be seen that the cylinder 11 below the piston 10, is open to the atmosphere through pipe 17 and port 28, and consequently the brake will be applied with full force, due to the action of spring 13 and weight 12. If the operating valve is now shifted to the first admission position, as shown in Fig. 2, communication will be established between the main reservoir 14 and the chamber 21, upon the left side of piston 22, until sufficient pressure has accumulated to shift the piston 22 to the right, which will compress spring 34, close exhaust ports 28, and establish communication between the main reservoir 14 and the brake cylinder 11, through pipe 15, valve chest 31, port 30, chamber 25 and pipe 17, and the brake will be released to an extent depending upon the amount of pressure admitted to chamber 21. When operating valve 18 is again placed in the lap position and the pressure has equalized upon opposite sides of piston 22, through port 27, the spring 34 will shift piston 22 a sufficient distance toward the left to cause valve 32 to close port 30 without opening ports 28 to the atmosphere. In this position of the parts it will be seen that the amount of pressure in the brake cylinder 11 will be substantially the same as that in the chamber 21 on the left of the piston 22, and consequently the brake piston 10 will remain in the position to which it has been shifted and the brakes remain partially released. If any leakage should occur in the pipes or connections, which would cause a reduction of pressure in the latter, and consequent increased applications of the brake, there will also occur a reduction of pressure in chamber 25, and, by reason of port 27, in chamber 21 on the right of the piston 22, which will cause the latter to move to the right, opening port 30 as before, and admitting pressure direct from the main reservoir 14 to the brake cylinder 11, thus maintaining at all times a constant pressure when desired in the brake cylinder irrespective of any leakage which may occur, and it will thus be seen that by providing a series of different sized admission ports $b$ in the operating valve 18, any desired operation may be obtained in the brake cylinder 11, and certain pressure having been established and the valve placed on lap the said pressure will be automatically maintained by the controlling valve 16.

When it is desired to reduce the pressure in cylinder 11 and thereby apply the brake, the operating valve 18 is shifted to the first exhaust position, in which position the small release port $c$ will register with pipe opening 19 and exhaust port 19ª, and the desired reduction of pressure therein is effected, the control valve being then turned to lap position to cut off further release of air. The piston 22 and valve 29 thereupon move toward the left a sufficient distance to open the ports 28 to the atmosphere, thus reducing the pressure in brake cylinder 11 and chamber 25 until it is equal upon each side of the piston 22. Should the pressure in chamber 25 fall below that in chamber 21 on the left of the piston 22, the piston will move toward the right, closing ports 28 and thus cutting off communication between chamber 25 and the atmosphere. It will thus be seen that by providing a series of different sized release ports $c$ as shown in Fig. 2, the brake may be thrown off quickly or slowly and the degree of application of the brake drum may be regulated to a nicety at the will of the operator.

In Figs. 3, 4 and 5 I have shown a slightly modified form of operating valve, which will more readily permit of the use of a plurality of different sized admission and release ports and which consists broadly of a valve casing 18ª made in two parts, the lower one of which is provided with a valve seat adapted to receive a hollow rotary valve 35 fitted thereon and operated by means of a handle 36 of any preferred construction. The lower part of the valve casing 18ª is also provided with connections for the pipes 15 and 19, and an exhaust opening 19ª which register with the parts in the valve in a manner similar to the construction illustrated in Fig. 2.

While I have shown two forms of operating valve, it will be obvious that any other form of valve suitable to the purpose, may be used, nor do I limit myself to the particular form of leverage shown, as various forms of brake levers may be used in connection with the brake and cylinder without departing from the nature of my invention.

By reference to the foregoing it will be seen that in my improved apparatus the operator may at all times, by increasing or decreasing the pressure in chamber 21, on the left side of piston 22, through the medium of valve 18, partially or wholly release or apply the brake with any degree of power, as the power acting to operate the piston 10 will be approximately the same as that existing in that portion of chamber 21 above referred to. It will also be seen that when the brake is once set it will be maintained automatically until the operator chooses either to increase, decrease or release it, and furthermore, if any accident happens to the piping or connections carrying the pressure, the brake will be set instantaneously and with a maximum amount of power and also that the brake may be released by hand manipulating the lever 2. Other advantages of the device will readily occur to those familiar with the art.

Having thus described my invention and illustrated its use, what I claim as new and desire to secure by Letters Patent is the following:

1. In a hoist brake, the combination with a spring tending to apply the brake, of a brake cylinder and a piston therein operated by fluid under pressure to oppose the spring, and means for normally maintaining a predetermined degree of pressure in the brake cylinder.

2. In a hoist brake, the combination with a spring for applying the brake, of a brake cylinder and a piston therein operated by fluid under pressure to oppose the spring, and means operating upon a reduction in fluid pressure to release air from said brake cylinder and cause the spring to apply the brake.

3. In a hoist brake, the combination with a spring for applying the brakes, of a brake cylinder and a piston therein, operating upon admission of fluid pressure to oppose the spring, and a valve mechanism operated by variations in fluid pressure and subject to the opposing pressure of the brake cylinder for governing the admission and release of fluid under pressure to and from the brake cylinder.

4. A hoist brake mechanism comprising in combination, a source of air pressure, an operating valve connected thereto, a brake cylinder and piston, and a pressure controlling means having connections to the source of air pressure direct to the operating valve, and to the brake cylinder, and adapted to automatically maintain a constant pressure in the brake cylinder, to hold the brakes released.

5. A hoist brake mechanism comprising in combination, a source of air pressure, an operating valve connected thereto, a brake cylinder and piston, and a pressure controlling valve having connections to the source of air pressure direct, to the operating valve, and to the brake cylinder, and adapted to automatically maintain a constant pressure in the brake cylinder, when the operating valve is in the lap position to hold the brakes released.

6. A hoist brake mechanism comprising in combination, a source of air pressure, an operating valve, provided with variable admission and release openings connected thereto, a brake cylinder and piston, and a pressure controlling valve having connections to the source of air pressure, to the operating valve and to the brake cylinder, and adapted to be controlled by the operating valve and automatically maintain a constant pressure in the brake cylinder to hold the brakes released when the operating valve is in the lap position.

7. A hoist brake mechanism comprising in combination, a hoist drum, a brake applied thereto, a piston operatively connected to said brake on the drum, means normally acting to apply the brake and fluid pressure mechanism for controlling the pressure acting on the piston in opposition to the braking force.

8. A hoist brake mechanism comprising in combination, a brake, yielding means for normally applying a constant pressure to the brake, a pressure operated piston operating in opposition to said yielding means, and means for variably controlling the pressure behind the piston whereby the braking force may be varied.

9. The combination with a brake, of a yielding means for normally applying a constant pressure thereto, a pressure operated piston operating in opposition to said yielding means, a reservoir for supplying pressure to the piston, and controlling means intermediate said piston and reservoir for varying the pressure on the piston and automatically maintaining it at the desired amount.

10. The combination with a brake, of a yielding means for normally applying a constant pressure thereto, a pressure operated piston operating in opposition to said yielding means, a main reservoir for supplying pressure to the piston, a casing provided with a controlling valve and piston intermediate said brake piston and main reservoir, a connection between the main reservoir and casing on one side of the controlling piston, together with an air operating valve located in said connection, whereby a predetermined amount of pressure may be applied to shift the controlling piston, and resilient means for shifting said piston in the opposite direction when the pressure has equalized upon each of its sides.

11. A hoist brake mechanism comprising in combination a hoist drum, a brake applied thereto, a brake piston operatively connected to said brake, a source of fluid pressure and a valve mechanism for controlling the supply of fluid to said piston, and adapted to automatically maintain the pressure acting on said piston constantly at any desired degree.

12. In a hoist brake, the combination with means adapted to exert pressure for applying the brake, of a piston actuated by fluid under pressure for exerting a counter pressure tending to release the brake, and a valve mechanism for maintaining a predetermined constant degree of fluid pressure on said piston.

13. In a hoist brake, the combination with means tending to apply the brake, of a piston the admission of fluid under pressure to which tends to release the brake and a valve mechanism for varying the fluid pressure on said piston to gradually apply and release the brakes.

In testimony whereof I have hereunto signed my name in the presence of the two subscribed witnesses.

HERBERT T. HERR.

Witnesses:
H. A. COWAN,
R. B. MILDEN.